H. G. ROBBINS.
TIRE.
APPLICATION FILED JAN. 30, 1918.
1,280,086.
Patented Sept. 24, 1918.
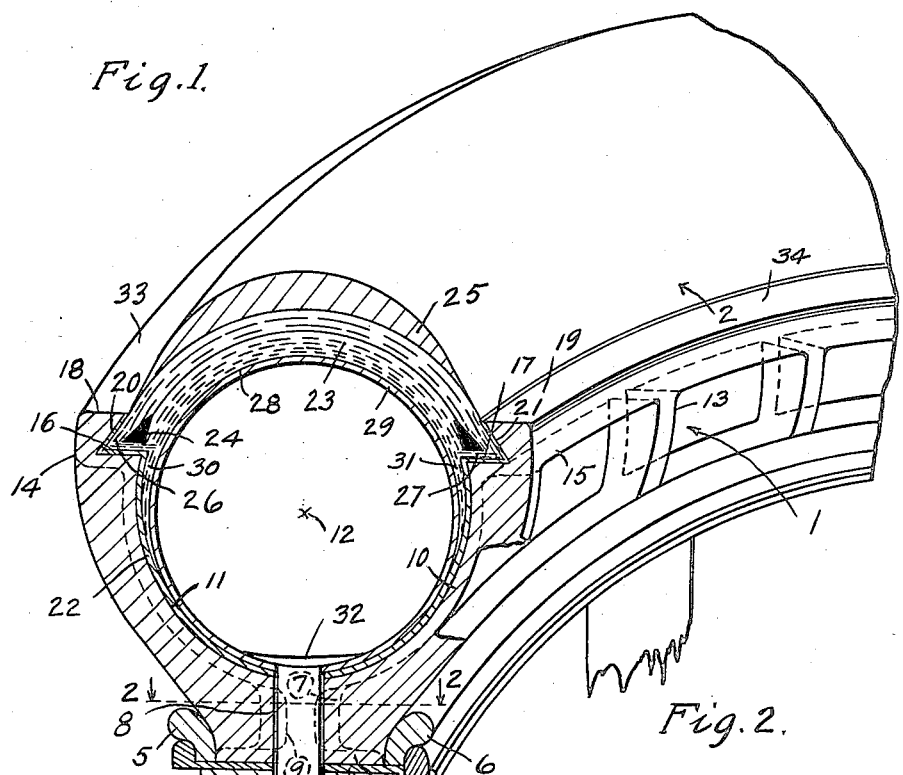
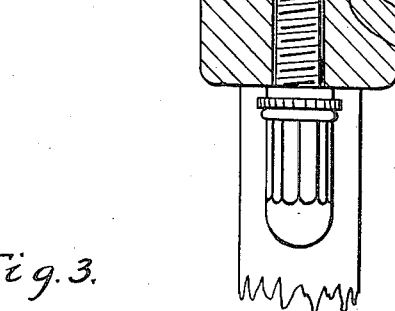
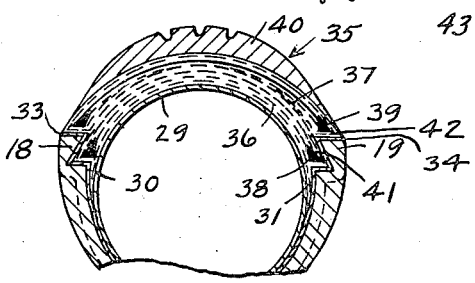
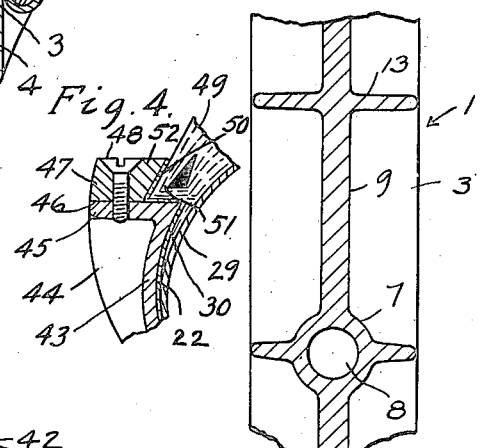
Inventor:
Harry G. Robbins,
by Hazard & Miller
Attys.

UNITED STATES PATENT OFFICE.

HARRY G. ROBBINS, OF LOS ANGELES, CALIFORNIA.

TIRE.

1,280,086.   Specification of Letters Patent.   Patented Sept. 24, 1918.

Application filed January 30, 1918.   Serial No. 214,537.

*To all whom it may concern:*

Be it known that I, HARRY G. ROBBINS, a citizen of the United States, residing at Los Angeles, in the county of Los Angeles and State of California, have invented new and useful Improvements in Tires, of which the following is a specification.

My object is to make a pneumatic tire construction in which there is more of the practically indestructible material and less of the wearable and destructible material.

A further object of my invention is to make a pneumatic tire which may be run deflated with less injury to the tire.

Another object of my invention is to make a pneumatic tire in which there is less material in the casing to be thrown away when the casing is worn out.

Other objects will appear hereinafter.

Figure 1 is a cross-section and fragmentary perspective of a pneumatic tire embodying the principles of my invention mounted upon a quick detachable rim and the rim mounted upon a felly.

Fig. 2 is a fragmentary horizontal section on the line 2—2 of Fig. 1.

Fig. 3 is a cross-section showing a modified form of tread casing.

Fig. 4 is a fragmentary cross-section analogous to Fig. 3 and showing another alternative or modified construction.

The pneumatic tire comprises the metal tread supporting casing 1 and the fabric and rubber tread casing 2.

The details of the metal supporting casing are as follows: The annular band 3 is adapted to fit the periphery of the tire rim 4 between the bead fillers 5 and 6. A bearing 7 extends radially from the band 3 and has an opening 8 to receive the air valve. A web 9 extends from the band 3 in line with the bearing 7 all the way around. The metal casing 10 extends from the outer edge of the web 9 all the way around, the inner face 11 of the casing being concentric to the center point 12 and extending more than half a circle in cross-section. Ribs 13 extend outwardly from the web 9 between the band 3 and the casing 10 to strengthen the casing, said ribs extending to the outer edges of the casing on both sides. Rims 14 and 15 extend outwardly from the outer edges of the casing 10 and connect to the outer ends of the ribs 13, the tread faces 16 and 17 of the rims being flat and concentric to the axis of the tire. Retaining flanges 18 and 19 extend outwardly from the outer edges of the tread rims 14 and 15 at right angles to the tread rims, said retaining flanges having flat inclined inner faces 20 and 21. A fabric lining 22 of any suitable construction is pasted to the inner face 11 of the casing 10 and the faces 16 and 17 of the rims 14 and 15 and the faces 20 and 21 of the flanges 18 and 19. This lining should be smooth and soft so as not to wear the inner tube. The metal supporting casing thus constructed takes the place of more than one-half of a pneumatic casing as now used and may be readily applied to any of the standard forms of casing rims or it may be mounted directly upon a felly without any casing rim.

The details of the fabric and rubber tread casing 2 are as follows: The body 23 is made up of fabric and bead fillers 24 are incorporated into the edges of the fabric and the rubber tread 25 is vulcanized to the fabric, the construction being similar to that of the casings now in use, the principal difference being in the shape and size. The beads 26 and 27 formed at the edges of the tread casing are triangular in cross-section and fit against the faces 16 and 17 and between and against the faces 20 and 21. The tread casing forms an arc of a circle equal to about one-third of a complete circle, and the inner face 28 forms a continuation of the inner face 11 of the metal tread support to make a circular chamber for the inner tube 29. Flaps 30 and 31 extend from the beads 26 and 27 flush with the inner face 28 and inside of the lining 22 to cover the joints between the edges of the metal tread supporting casing 1 and the fabric rubber tread casing 2.

The inner tube 29 is of the usual construction and has an air valve 32 of the usual construction.

The partially inflated inner tube 29 is placed in position with the air valve 32 extending through the opening 8, then the fabric and rubber tread casing 2 is sprung into position, and the inner tube inflated to the desired extent. The pressure of the inner tube will hold the fabric and rubber tread 2 securely in place.

The peripheries upon the flanges 18 and 19 are flat and concentric to the axis and form metal treads 33 and 34 and when the inner tube becomes deflated, as by a puncture, the casing 2 will press into the cavity between the metal treads 33 and 34 and said metal treads will support the load without injuring the casing. When the tread casing becomes worn, punctured, or blown out, it may be removed and repaired in the usual way and replaced or a new tread casing may be supplied.

In a modification shown in Fig. 3 the fabric and rubber tread casing 35 consists of a double fabric construction 36 and 37 having a double set of bead fillers 38 and 39 and the rubber tread 40 is secured to the fabric construction 37. The beads 41 fit within the flanges 18 and 19 and the beads 42 fit the metal treads 33 and 34 so that when the tire is deflated the tread 35 will collapse into the cavity and the beads 42 will still form non-metallic cushions for the wheel to run upon.

In the modification shown in Fig. 4, the metal casing 43 has supporting ribs 44 and a rim 45 extending outwardly from the edge of the casing 43, the tread face 46 of the rim being flat and concentric to the axis of the tire, and the retaining flange 47 is removably connected to the rim 45 by countersunk cap screws 48 inserted through the flange and screw-seated in the rim, so that the flange may be removed to remove or insert the tread casing 49. The flange 47 has a beveled inner face 50 to engage the bead 51 of the tread casing. The distinction between the construction shown in Fig. 4 and that shown in Figs. 1 and 3 simply consists in making the flange 18 removable. The tread face 52 of the flange is continuous and smooth like the tread face 33.

Various changes may be made in the details of construction without departing from the spirit of my invention as claimed.

I claim:

1. A tire comprising a metallic tread supporting casing forming a cavity, tread faces extending from the outer edges of the metallic casing, retaining flanges extending from the tread faces at right angles and having inclined inner faces and forming metal treads; one of said retaining flanges being removably mounted; and a fabric and rubber tread casing having beads seated between the retaining flanges upon the tread faces and beads seated upon the metal treads.

2. In a tire, an annular metal band, a bearing extending radially from the band and having an opening, a web extending outwardly from the band, a metal casing extending from the outer edge of the web, said casing being more than half a circle in cross section, ribs extending outwardly from the web between the band and metal casing, rims extending outwardly from the outer edges of the casing and connected to the outer ends of the ribs, there being flat tread faces upon the rims concentric to the axis of the tire, retaining flanges extending outwardly from the outer edges of the rims and having inclined inner faces, a fabric lining fitting the inner face of the metal casing and fitting the tread faces and the inclined faces, an inner tube against the lining and having a valve in the opening through the bearing, and a fabric and rubber tread casing fitting the tread faces and covering the inner tubes.

3. In a tire, an annular metal band, a bearing extending radially from the band and having an opening, a web extending outwardly from the band, a metal casing extending from the outer edge of the web, said casing being more than half a circle in cross section, ribs extending outwardly from the web between the band and metal casing, rims extending outwardly from the outer edges of the casing and connected to the outer ends of the ribs, there being flat tread faces upon the rims concentric to the axis of the tire, retaining flanges extending outwardly from the outer edges of the rims and having inclined inner faces, a fabric lining fitting the inner face of the metal casing and fitting the tread faces and the inclined faces, an inner tube against the lining and having a valve in the opening through the bearing, and a fabric and rubber tread casing fitting the tread faces and fitting the inclined faces and metal treads of the retaining flanges, and covering the inner tubes.

In testimony whereof I have signed my name to this specification.

HARRY G. ROBBINS.